(12) United States Patent
Cash et al.

(10) Patent No.: US 11,587,061 B2
(45) Date of Patent: *Feb. 21, 2023

(54) SYSTEM AND METHOD FOR BEACON BASED NAVIGATION TO OFFER BASED TRANSACTIONS AND BEACON BASED DIGITAL TRANSACTIONS WITH MULTIPLE LAYER AUTHENTICATION

(71) Applicant: VISA INTERNATIONAL SERVICE ASSOCIATION, San Francisco, CA (US)

(72) Inventors: Duane Cash, San Francisco, CA (US); Patrick Faith, Foster City, CA (US); Scott Edington, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 160 days.

This patent is subject to a terminal disclaimer.

(21) Appl. No.: 16/950,932

(22) Filed: Nov. 18, 2020

(65) Prior Publication Data
US 2021/0073782 A1 Mar. 11, 2021

Related U.S. Application Data

(63) Continuation of application No. 14/985,313, filed on Dec. 30, 2015, now Pat. No. 10,861,001.

(Continued)

(51) Int. Cl.
G06Q 20/32 (2012.01)
G06Q 20/42 (2012.01)
G06Q 30/0251 (2023.01)

(52) U.S. Cl.
CPC ....... *G06Q 20/3224* (2013.01); *G06Q 20/322* (2013.01); *G06Q 20/42* (2013.01); *G06Q 30/0259* (2013.01); *G06Q 30/0267* (2013.01)

(58) Field of Classification Search
CPC .. G06Q 20/3224; G06Q 20/322; G06Q 20/42; G06Q 30/0259; G06Q 30/0267
See application file for complete search history.

(56) References Cited

U.S. PATENT DOCUMENTS

| | | | |
|---|---|---|---|
| 8,646,060 B1 * | 2/2014 | Ben Ayed | H04W 4/20 726/9 |
| 10,861,001 B2 | 12/2020 | Cash | |

(Continued)

OTHER PUBLICATIONS

"Mobile local macropayments: security and prototyping" Gianluigi Me and Maurizio Adriano Strangio, Alexander Schuster Published by the IEEE CS and IEEE ComSoc (Year: 2006).*

(Continued)

*Primary Examiner* — Alexandru Cirnu
(74) *Attorney, Agent, or Firm* — Loeb & Loeb LLP

(57) ABSTRACT

A system and method of interaction with beacons to execute a multiple layer authenticated transaction process including receiving a signal from the beacon, analyzing a relative signal strength of the beacon, enabling a portable computer device to complete the digital transaction based on the proximity of the portable computer device to an item for purchase. A first user verification input is additionally received via the portable computer system. In response to the first user verification, receiving a verification signal.

20 Claims, 18 Drawing Sheets

Related U.S. Application Data

(60) Provisional application No. 62/099,023, filed on Dec. 31, 2014, provisional application No. 62/099,008, filed on Dec. 31, 2014.

(56) References Cited

U.S. PATENT DOCUMENTS

| | | |
|---|---|---|
| 2002/0194141 A1 | 12/2002 | Langensteiner |
| 2008/0004888 A1 | 1/2008 | Davis |
| 2009/0144161 A1 | 6/2009 | Fisher |
| 2011/0238517 A1 | 9/2011 | Ramalingam |
| 2012/0022948 A1 | 1/2012 | Jones |
| 2013/0210461 A1 | 8/2013 | Moldavsky |
| 2013/0281084 A1 | 10/2013 | Batada |
| 2013/0282454 A1 | 10/2013 | Alpert |
| 2014/0114780 A1 | 4/2014 | Menefee |
| 2014/0136411 A1 | 5/2014 | Cho |
| 2014/0211699 A1 | 7/2014 | Zhou |
| 2014/0244514 A1* | 8/2014 | Rodriguez ........... G06Q 20/227 348/150 |
| 2015/0121506 A1 | 4/2015 | Cavanaugh |
| 2015/0244699 A1 | 8/2015 | Hessler |
| 2016/0092943 A1* | 3/2016 | Vigier .................. H04W 4/70 705/346 |
| 2016/0127351 A1 | 5/2016 | Smith |
| 2016/0189132 A1 | 6/2016 | Cash |
| 2018/0365677 A1* | 12/2018 | Baldie ................ G06Q 20/3224 |
| 2022/0318785 A1* | 10/2022 | Lim .................... G06Q 20/3674 |

OTHER PUBLICATIONS

Cavalini, Andy. iBeacons Bible 1.0. Dec. 2013. Retrieved from <https://meetingofideas.files.wordpress.com/2013/12/ibeacons-bible-1-0.pdf> on Aug. 5, 2018. 15 pages.

European Extended Search Report dated May 30, 2018 for EP Application No. EP15876320.1, 8 pages.

International Search Report and Written Opinion issued in Corresponding International Application No. PCT/US2015/068201, dated Feb. 26, 2016, 13 pages.

Notice of Allowability dated Sep. 18, 2020 for U.S. Appl. No. 14/985,313 (pp. 1-2).

Notice of Allowance dated Aug. 4, 2020 for U.S. Appl. No. 14/985,313 (pp. 1-6).

Office Action dated Aug. 10, 2018 for U.S. Appl. No. 14/985,313 (pp. 1-11).

Office Action dated Feb. 4, 2020 for U.S. Appl. No. 14/985,313 (pp. 1-12).

Office Action dated Jan. 25, 2019 for U.S. Appl. No. 14/985,313 (pp. 1-11).

Office Action dated May 19, 2020 for U.S. Appl. No. 14/985,313 (pp. 1-8).

Vlugt, Erik; Bluetooth Low Energy, Beacons and Retail; Oct. 23, 2013; 12 pages; San Jose, CA.

* cited by examiner

SYSTEM AND METHOD FOR BEACON BASED NAVIGATION TO OFFER BASED TRANSACTIONS AND BEACON BASED DIGITAL TRANSACTIONS WITH MULTIPLE LAYER AUTHENTICATION

CROSS-REFERENCE TO RELATED APPLICATION

This application is a continuation application of U.S. nonprovisional application Ser. No. 14/985,313, filed on Dec. 30, 2015, which is a nonprovisional application of provisional applications, Ser. Nos. 62/099,008 and 62/099,023, both filed on Dec. 31, 2014. In addition, the present application is related to a counterpart PCT application, serial number PCT/US15/68201, filed on Dec. 30, 2015, claiming priority to the above provisional applications. These referenced applications' disclosures are incorporated by reference in its entirety herein.

BACKGROUND

Digital transaction security is of increasing importance as digital transactions have become ubiquitous. Physical payment devices, such as credit cards, provide a layer of security by requiring the presence of a card to complete the transaction but require additional hardware such as checkout devices that may additionally require staff assistance provided by the merchant. Merchant based point of sale transactions are further limited due to additional staffing needs and physical limitations of the placement of checkout lanes within a store. Conventional card present transactions are further limited in providing biometric means of authentication. Digital transactions associated with customer accounts represented by credit cards do not incorporate a physical presence requirement. Conventional means of completing a card present and digital transactions transaction further fail to create a seamless customer experience that integrates the shopping experience, advertisement, offers, and purchase in a single system that the customer can access and/or manage on his own portable computer system along with multiple layer authentication.

Also, when customers enter a store, they may use store directories physically posted on throughout various locations within the stores. However, static store directories may require the customer to locate the directory itself and may provide only limited assistance based on visibility limitations. Further drawbacks of conventional mapping systems are based on the use of cellular networks. The structure of a building itself may interrupt or render continuous cellular or wireless service unusable or unreliable.

As such, customers may be initially drawn to a store from consulting mailers, email advertisements or other offers that have provided incentives for the customer to visit a store. Offers and emailed incentives provided to customers through text, email or printed mail provide customers with little interaction with the shopping experience. A customer may have difficulty remembering whether items are on sale once entering the store based on advertisements and offers that were received previously through the mail.

SUMMARY

Embodiments of the invention disclose a system and a method which interacts with electronic beacons to execute a multiple layer authenticated transaction review process comprising a processor for executing computer executable instructions, a memory to store the computer executable instructions, and an input output circuit to receive signals from an electronic beacon. The computer executable instructions may comprise instructions for receiving via the input output circuit a signal from the electronic beacon, analyzing via the processor a relative strength of the signal from the electronic beacon in response to the signal strength being determined by the processor to be over a first threshold, identifying via the processor the portable computer system as being within a far range of the beacon, and displaying via the beacon a welcome message to be displayed on a display screen of the portable computer system. The method may further include, in response to the signal strength being determined by the processor to be over a second threshold, identifying via the processor that the portable computer system has moved within a near zone of the beacon and displaying an offer to be displayed on the display screen of the portable computer system. In response to the signal strength being determined by the processor to be over a third threshold, the method may include identifying that the portable computer system has moved within an immediate zone of the beacon. The method may also include displaying an option to complete a digital transaction based on the proximity of the portable computer system to an item for purchase and enabling the portable computer system to complete the digital transaction based on the proximity of the portable computer system to an item for purchase. The method may still yet further include receiving a first user verification input via the portable computer system, communicating the first user verification input to a verification system via the input output circuit and in response to the first user verification input being approved by the verification system, receiving a verification signal.

According to another embodiment, aspects of the invention includes a system and a method to interact with electronic beacons to execute a transaction process comprising a processor for executing computer executable instructions, a memory to store the computer executable instructions, an input output circuit to receive signals from an electronic beacon and to announce the portable computing device. The computer executable instructions comprise instructions for identifying a location of a portable computing device within a boundary of electronic beacons using the processor to determine signal strength of the various electronic beacons and displaying, via the input output circuit, one or more offers wherein the offer are related to the location of the portable computing device to the plurality of beacons. The system and method further disclose updating directions based on the nearest electronic beacon as the nearest electronic beacon changes and in response to the nearest electronic beacon for the selected destination being the nearest electronic beacon to the portable computing system, displaying on the portable computing system, an opportunity to purchase the item via the portable computing system.

In one embodiment, a system for configuring a multi-layered verification system for completing a transaction includes a beacon emitting device for transmitting beacons on a time interval. The beacons may include contents with varying messages as a function of signal strengths of the beacons. The signal strengths may indicate zones in a defined space covered by the beacons. A portable computer device includes an input/output circuit for sensing the beacons to identify the signal strengths thereof, a device processor, and an interface. The device processor may determine the signal strengths in the sensed beacons being over a second threshold. In response to the determination being positive, the device processor may provide via the interface a first of the varying messages corresponding to the second threshold in the sensed beacons. The system also includes that, in response to providing the first of the varying messages, the portable computer device, after being repositioned to sense the beacons, may determine the signal strengths to be over a third threshold. In response to the determination being positive, the device processor may provide via the interface a second of the varying messages corresponding to the third threshold. The beacon emitting device may receive a receipt from the portable computer device for receiving the second of the varying messages. The system further includes a transaction approval server, being configured to communicate with the beacon emitting device, may establish a verification system to process digital transactions in response to receiving the receipt. The transaction approval server may identify the receipt as a first layer of the verification system. The portable computer device may receive an instruction from a user via the interface to complete one of the digital transactions of an item. The transaction approval server, in response to receiving the instruction, may identify the instruction as a second layer of the verification system. In response to the identified instruction, the transaction approval server may approve the second layer of the verification system. The transaction approval server may transmit an acknowledgement receipt to the portable computer device for the one of the digital transactions of the item.

In accordance with another embodiment, a computerized method for configuring a multi-layered verification system for completing a transaction, said computerized method comprising:
  establishes, by a beacon server being configured to communicate with a beacon emitting device, a verification system to process digital transactions;
  receiving from the beacon emitting device a receipt in response to a first user instruction provided on a portable computer device responding to messages provided as a function of signal strengths of beacons from the beacon emitting device, wherein the beacon emitting device transmits the beacons on a time interval, said beacons including contents with varying messages as a function of signal strengths thereof, wherein the beacon server identifies the receipt as a first layer of the verification system;
  receiving, by the beacon server, a second user instruction from the portable computer device to complete one of the digital transactions of an item;
  identifying, in response to receiving the second user instruction, by the beacon server, identifies the instruction as a second layer of the verification system;
  approving, by the beacon server, the second layer of the verification system; and
  transmitting from the beacon server an acknowledgement receipt to the portable computer device for completing the one of the digital transactions of the item.

In another embodiment, a system is configured to complete a transaction with a beacon-assisted navigation. The system includes a beacon emitting device for transmitting beacons on a time interval. A portable computer device includes an input/output circuit for sensing the beacons to identify the signal strengths thereof,
  a device processor and an interface. The device processor determines the signal strengths in the sensed beacons being over a second threshold. In response to the determination being positive, the device processor identifies the varying messages corresponding to the second threshold in the sensed beacons. The device processor also identifies from an additional source recommending items of interests for a user to consider in the defined space. The system further includes that the device processor analyzes the identified items of interests and the identified varying messages. In response to analyzing, the device processor provides a first of the varying messages via the interface with the first of the varying messages including an offer to purchase an item. The portable computer device, after being repositioned to sense the beacons, further determines the signal strengths to be over a third threshold. The device processor provides via the interface a second of the varying messages corresponding to the third threshold. The system further includes a beacon or a transaction approval server, being configured to communicate with the beacon emitting device, to receive a receipt from the beacon emitting device. In response to providing the second of the varying messages, the portable computer device receives an instruction from a user via the interface to complete one of the digital transactions of the item. The transaction approval server approves the one of the digital transactions after receiving the instruction from the user. The transaction approval server, being configured to communicate with the portable computer device, transmits an acknowledgement receipt to the portable computer device for the one of the digital transactions of the item.

In accordance with another embodiment, a computerized method for configuring a multi-layered verification system for completing a transaction, said computerized method comprising:
  establishes, by a beacon server being configured to communicate with a beacon emitting device, a verification system to process digital transactions;
  receiving from the beacon emitting device a receipt in response to a first user instruction provided on a portable computer device responding to messages provided as a function of signal strengths of beacons from the beacon emitting device, wherein the beacon emitting device transmits the beacons on a time interval, said beacons including contents with varying messages as a function of signal strengths thereof, wherein the beacon server identifies the receipt as a first layer of the verification system;
  receiving, by the beacon server, an additional source recommending items of interests for a user to consider in the defined space;
  receiving, by the beacon server, a second user instruction from the portable computer device to complete one of the digital transactions of an item, said item being provided in response to the additional source and as a function of messages from the beacon emitting devices;
  identifying, in response to receiving the second user instruction, by the beacon server, identifies the instruction as a second layer of the verification system;
  approving, by the beacon server, the second layer of the verification system; and
  transmitting from the beacon server an acknowledgement receipt to the portable computer device for completing the one of the digital transactions of the item.

In a further embodiment, a system is configured a multi-layered verification system for completing a transaction. The system includes a beacon emitting device for transmitting beacons on a time interval. The beacons include contents with varying messages as a function of signal strengths of the beacons, and the signal strengths indicating zones in a defined space covered by the beacons. A portable computer device senses the beacons to identify the signal strengths thereof and determines the signal strengths in the sensed beacons being over a second threshold. In response to the determination being positive, the portable computer device identifies the varying messages corresponding to the second threshold in the sensed beacons. The portable computer device further identifies from an additional source recommending items of interests for a user to consider in the defined space. The portable computer device further compares the identified items of interests and the identified varying messages. In response to comparing, the portable computer device provides a first of the varying messages. The first of the varying messages includes an offer to purchase an item. The system further, in response to providing the first of the varying messages, the portable computer device, after being repositioned to sense the beacons, determines the signal strengths to be over a third threshold. In response to the determination being positive, the portable computer device provides a second of the varying messages corresponding to the third threshold, and the second of the varying messages is an invitation to complete one of the digital transactions of the item. The beacon emitting device receives a receipt from the portable computer device for receiving the second of the varying messages. A transaction approval server, being configured to communicate with the beacon emitting device, establishes a verification system to process digital transactions in response to receiving the receipt. The transaction approval server identifies the receipt as a first layer of the verification system. The portable computer device receives an instruction from a user to complete one of the digital transactions of the item, and the transaction approval server, in response to receiving the instruction, identifies the instruction as a second layer of the verification system. The transaction approval server may approve the second layer of the verification system. The transaction approval server transmits an acknowledgement receipt to the portable computer device for the digital transaction of the item.

In accordance with yet another embodiment, a computerized method for configuring a multi-layered verification system for completing a transaction, said computerized method comprising:

establishes, by a transaction approval server being configured to communicate with a beacon emitting device, a verification system to process digital transactions;

receiving from the beacon emitting device a receipt in response to a first user instruction provided on a portable computer device responding to messages provided as a function of signal strengths of beacons from the beacon emitting device, wherein the beacon emitting device transmits the beacons on a time interval, said beacons including contents with varying messages as a function of signal strengths thereof, wherein the beacon server identifies the receipt as a first layer of the verification system;

receiving, by transaction approval server, from the portable computer device, an additional source recommending items of interests or presence of the portable computer device;

receiving, by the transaction approval server, a second user instruction from the portable computer device to complete one of the digital transactions of an item, said item being provided as a function of messages from the beacon emitting devices and the recommended items of interests;

identifying, in response to receiving the second user instruction, by the transaction approval server, identifies the instruction as a second layer of the verification system;

approving, by the transaction approval server, the second layer of the verification system; and transmitting from the transaction approval server an acknowledgement receipt to the portable computer device for completing the one of the digital transactions of the item.

DETAILED DESCRIPTION

Figure 1:
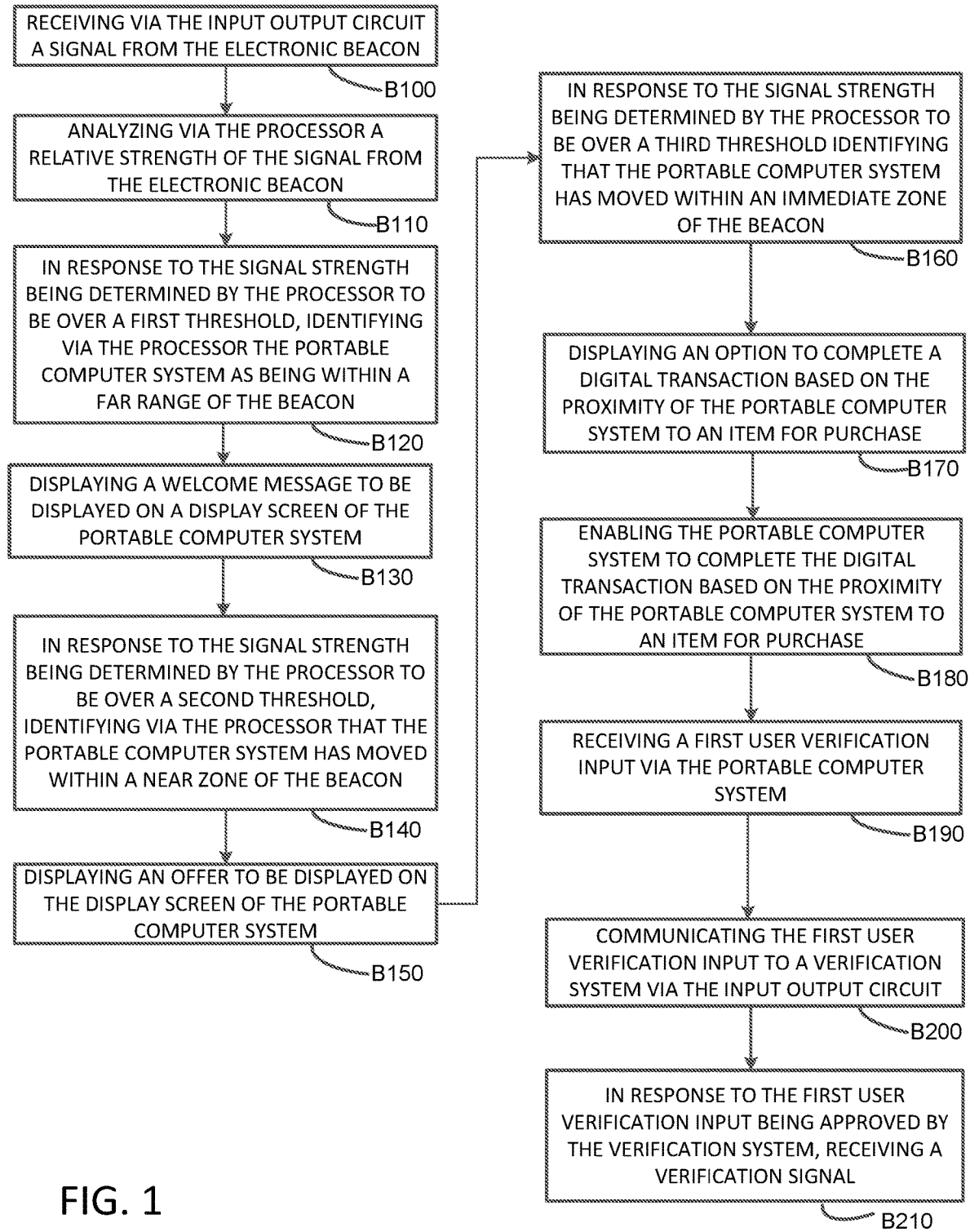
FIG. 1 is a flow diagram of a method in accordance with the subject technology according to one embodiment of the invention.

Using wireless personal area network technology (such as beacon technology like Bluetooth Low Energy) or short-range wireless communication protocol, the subject technology provides threshold based messages and offers, ultimately providing a way for customers to conduct multi-layered authenticated transactions to cardholding customers with a portable computing device (such as a smartphone or tablet). The messages and offers may include proximity notifications letting the consumer know that he is within a far, near, and immediate range that is ultimate associated with a universally unique identifier (UUID) (identifier distinguishing beacons used by the store chain, brand, or the app), major and minor pairs (specifying a group of beacons and specifying an individual beacon, respectively), and distance value (a signal strength) to a beacon in the store or location. Offers or incentives may be provided along with navigation notifications. Multi-layered authenticated transactions includes using the proximity of the customer's portable computer device to the desired item for purchase while at the point of sale as determined by proximity to a beacon. Additional layers of authentication are provided by user input such as gesture, user entry, fingerprint, voice input, photographic input, video input, or other sensor based input collected from peripherals of the customer's portable computer device.

Additional embodiments may include a fraud analysis system that includes sending information to a fraud analysis system that includes proximity information (such as the last received signal strength of the nearest beacon) and the UUID of that beacon to the fraud analysis system. A fraud approval signal must be received before the item may be purchased as an additional layer of authentication based on the sent information regarding the nearest beacon location and the nearest beacon UUID.

A technical advantage of the subject technology is to provide customer with secure transactions in a store setting. An additional advantage includes assisting customers with secure transactions by using the customer's physical location as a layer of authentication. Usage of the physical location of the customer (by virtue of the physical location of the customer's portable computer system as determined by beacons) allows a multi-layer authentication without requiring customer input for all layers of authentication. Still yet another advantage of the subject technology is the provision of a system and method using beacons using Bluetooth Low Energy and geofencing (a virtual perimeter or threshold) to provide micro-location awareness.

Embodiments of the invention consist of a system whereby a cardholding customer with a portable consumer device can receive beacon notifications from a store establishment based upon a proximity-based Bluetooth Low Energy beacon at an event, in a store or another location. The receiving device may detect the proximity ranges of far, near, and immediate associated with a UUID, Major and minor pairs, distance values to determine incentives, offers and rewards for customers within the establishment. The system may allow customers to gain information, navigation and offers for items of interest in the store and initiate digital transactions from the device for items once the items are within reach on the shelf (i.e., within an immediate zone). The customer's device is identified as having moved within an immediate zone of the beacon by virtue of the signal strength (distance value) of the beacon nearest the item selected for purchase, which enables the digital transaction to be completed. Authorization of the payment may then be completed with a display of a button on the customer's portable computer device that triggers a fingerprint scan and/or other user verification input to identify the authorized customer with the payment account.

Figure 2:
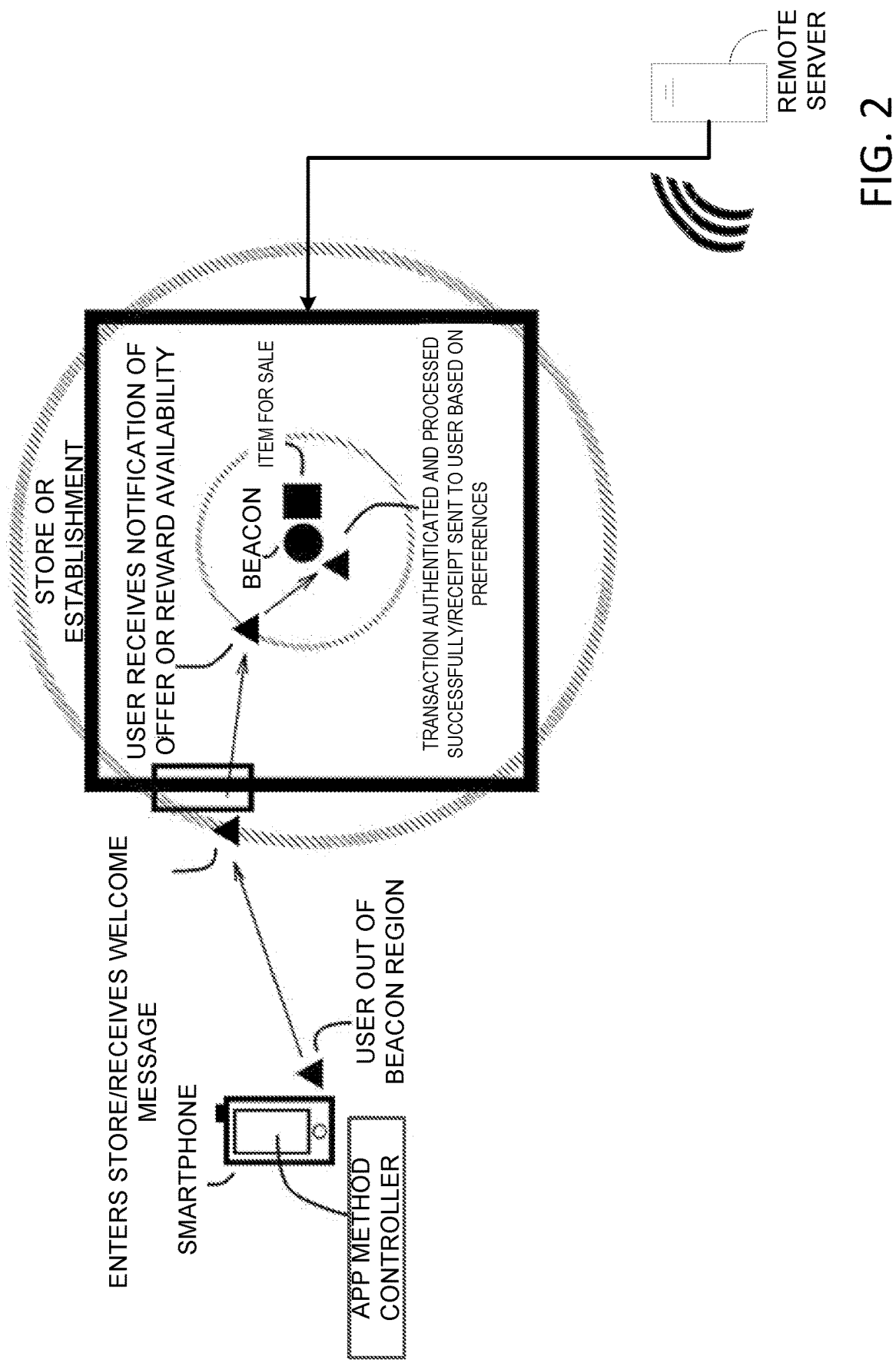
FIG. 2 is an illustration of an exemplary system for the beacon based digital payments on a smartphone device in accordance with an embodiment of the subject technology.

Referring now to FIG. 1 with reference to FIG. 2, at block B100, a signal is received via the input output circuit from electronic beacon(s). In one embodiment, the electronic beacons may be beacon emitting devices, such as a beacon emitting device 208. The signal may be initially received when a customer enters or approaches a store (e.g., 206), such as illustrations shown in FIG. 2 (with reference to keys shown in FIG. 9). In the illustration in FIG. 2, the beacon emitting device 208 is not a specific item; it is near the specific item. The portable computer device may be required to be a device that is authorized by the store or event as an authorized portable consumer device (i.e., receiving device, client device, smart phone, portable computer system). The store or event may provide portable computer devices to consumers for use while in the store or at the event and may be provided at an entrance for customers to conveniently pick-up for use immediately upon entry. The customer may need to activate, download or turn on an application or "app" before coming within proximity of one of the beacons in order to being use of the subject technology (e.g., FIG. 2). If the customer is already in the store at the time the app is turned on, the initial signal may be initially received.

At block B110, the processor of the portable computer system or portable computer device (e.g., 204) analyzes a relative strength of the signal received from the electronic beacon to determine distance. Additional information or message content may be received in the signal far, near, and immediate are determined based on UUID, major and minor pairs. Exemplary ranges that may be associated with far, near, and immediate ranges may be thirty meters, two meters, and one half meters. Other ranges may be implemented without departing from the scope of the subject technology. If the customer is outside the range of the far zone, and the customer has enabled his application, the customer may receive a message stating the proximity to the nearest store or even is unknown. At block B120, in response to the signal strength being determined by the processor to be over a first threshold, the portable computer system identifies the location of the portable computer system as being within a far range of the beacon. At block B130, a welcome message is displayed on a display screen of the portable computer system. Initial welcome messages may include an identification of the store number, address, contact information, offers or other information.

At block B140, in response to the signal strength being determined by the processor to be over a second threshold, the processor identifies that the portable computer system's location has moved within a near zone of the beacon. In one non-limiting example, the near zone may consist of a geofence (i.e., virtual perimeter or threshold) of two meters. Within this zone the user may be presented with an offer, purchase incentive, or other information regarding products in the near vicinity. The notification may indicate that the customer should come closer to the item to purchase the product. At block B150, an offer is displayed on the display screen of the portable computer system. Once the customer has moved within the region that has been determined as the immediate range, the customer may be invited to purchase the product. At block B160, in response to the signal strength being determined by the processor to be over a third threshold, the processor identifies that the portable computer system has moved within an immediate zone of the beacon. At block B170, an option to complete a digital transaction is displayed on a display screen of the portable computer system based on the proximity of location of the portable computer system to an item for purchase.

At block B180, the portable computer system is enabled to complete the digital transaction based on the proximity of the portable computer system to an item for purchase by in communication with a server 202, such as a beacon server, a transaction approval server, or the like. In one example, the server 202 is connected to the store 206, the beacon emitting device 208, the portable computer device 204, or the overall system illustrated in FIG. 2, 9 or 10A via a wired or wireless connection. The proximity of the customer's portable computer system to the item for purchase serves as the first layer of authentication for the digital transaction. The physical proximity of the device to the item (as determined by proximity of the device to the nearest beacon) establishes a first verification that the customer is physically in the store. This first layer of authentication serves a goal of the invention of providing a seamless layer of authentication without requiring additional user input from the customer.

At block B190, a first user verification input via the portable computer system is received at, such as the server 202. The first user verification serves as the second layer of authentication for the digital transaction. User verification may include a fingerprint scan on the touch screen or other sensor of the customer's portable computer system. Other first user verification inputs may include user name entry, password entry, gesture recognition pattern entry, signature or other identification pattern. Still yet other first user verification inputs may include iris scan, photographic input via a camera of the portable computer system, At B200, the first user verification input is communicated to a verification system via the input output circuit. At B210, a verification signal is received in response to the first user verification input being approved by the verification system. Multiple user inputs may be required. If any one of the initial user inputs does not provide a valid entry, the customer may be prompted to re-enter the user input. If additional entries are not valid, a different type of user input may be required.

The user may receive a receipt or acknowledgment of a successful transaction on the screen of the device, by email or by other form of electronic messaging. The customer may alternatively or additionally may be provided with notification information including additional directions via beacon to a staff member of the merchant for confirmation of purchase, assistance with large merchandise, for printed copies of receipts or warranties or other documentations associated with the purchase.

Additional steps may include completing the transaction via the portable computer device by communication of digital payment information to a payment or transaction approval system via the input-output circuit, and in response to the digital payment being approved by the payment or transaction approval system, receiving confirmation of a successful transaction, and displaying a transaction receipt on the portable computer device.

In one alternative embodiment, the transaction need not be conducted while the portable computer system is in the hand of the customer to complete the transaction. Alternatively, self-checkout kiosks may be provided throughout the store. Once an item is identified by the customer through the self-checkout kiosk, the kiosk may detect a transmitted signal from the customer's portable computer system transmitting a signal (including at least a UUID), acting as a beacon. In this embodiment, the immediate proximity of the portable computer system is verified as the initial layer of authenticity. Additional user input may be input into the self-checkout kiosk via camera, microphone, or touch sensitive display screen and analyzed using facial gesture recognition. Purchases may be confirmed by nodding, saying "yes" or entering information into the touch sensitive display screen, including passwords, user names, fingerprints, iris scans or other information. The customer may be guided through this process via prompts on a display screen of the self-checkout kiosk. Multiple user inputs may be required. If an initial user input does not provide a valid entry, the customer may be prompted to re-enter the user input. If additional entries are not valid, a different type of user input may be requested.

In another embodiment, the portable computing device of the customer may communicate a low power signal, such as a beacon signal, and receivers in the store may evaluate the signal to determine if it is within one or more thresholds. Depending on the signal strength, the customer may be classified as being in a near, intermediate or far zone and relevant messages may be displayed as previously described. Similarly, the receivers may display messages and may be used to complete transactions at the point of sale. Of course, various other arrangements of beacons and portable computing devices are possible and are contemplated.

Figure 4:
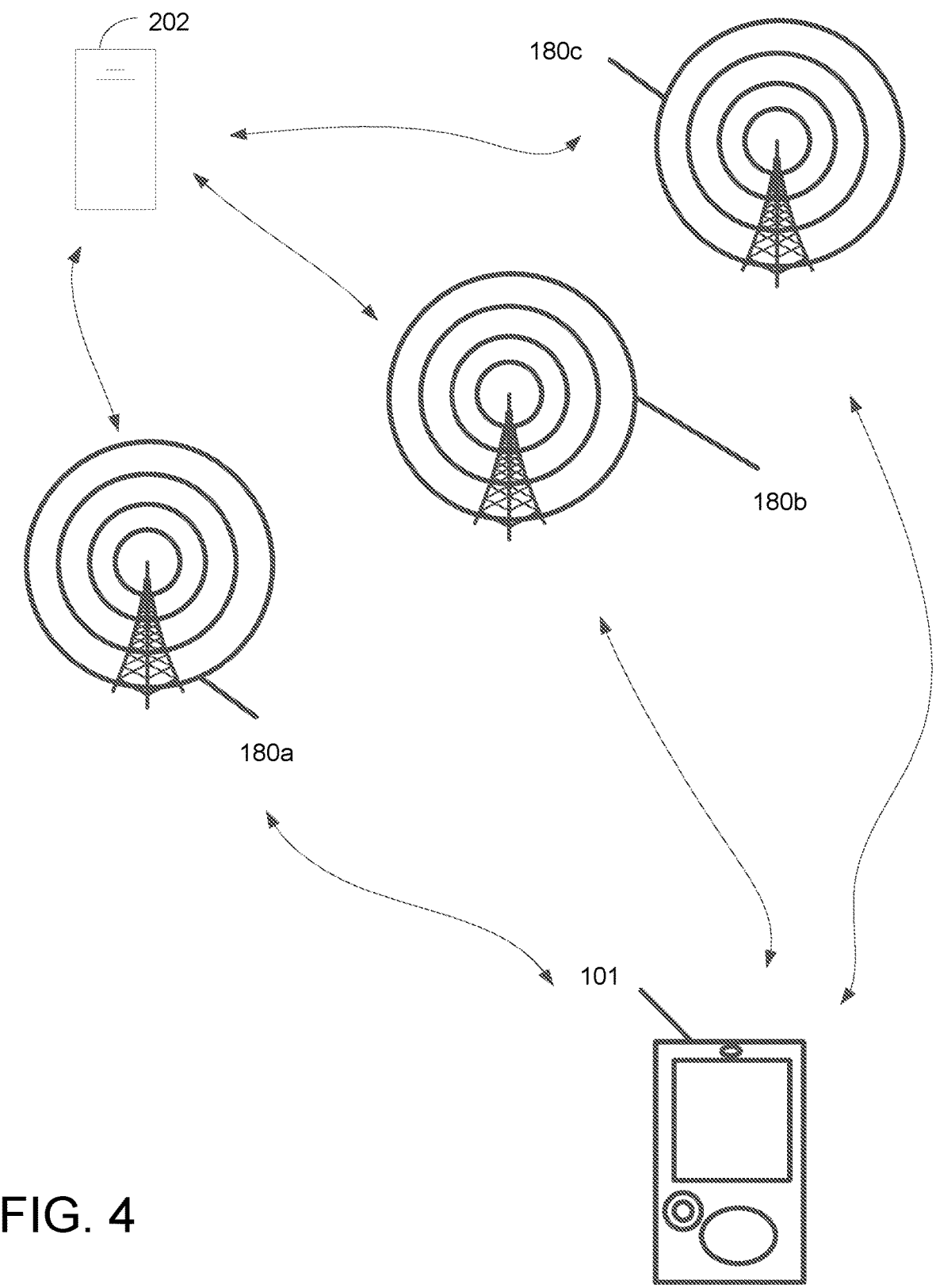
FIG. 4 is an illustration of a sample computing environment physically configured to execute the embodiments of the method according to one embodiment of the invention.

FIG. 4 is an illustration of a sample computing environment physically configured to execute embodiments of the method. In this computing environment, the portable computer devices 101 may act as a receiver or a portable computer device, which receives signals from dedicated hardware beacons and determine the signal strength of those signals. Beacons 180*a*, 180*b*, and 180*c* may be dedicated hardware devices that are capable of transmitting at least a UUID and major and minor pairs. Beacons may also be other portable computer devices 101. Proximate distance of portable computer device 101 from to any one or more of beacons 180 may be determined by the received signal strength.

Figure 5:
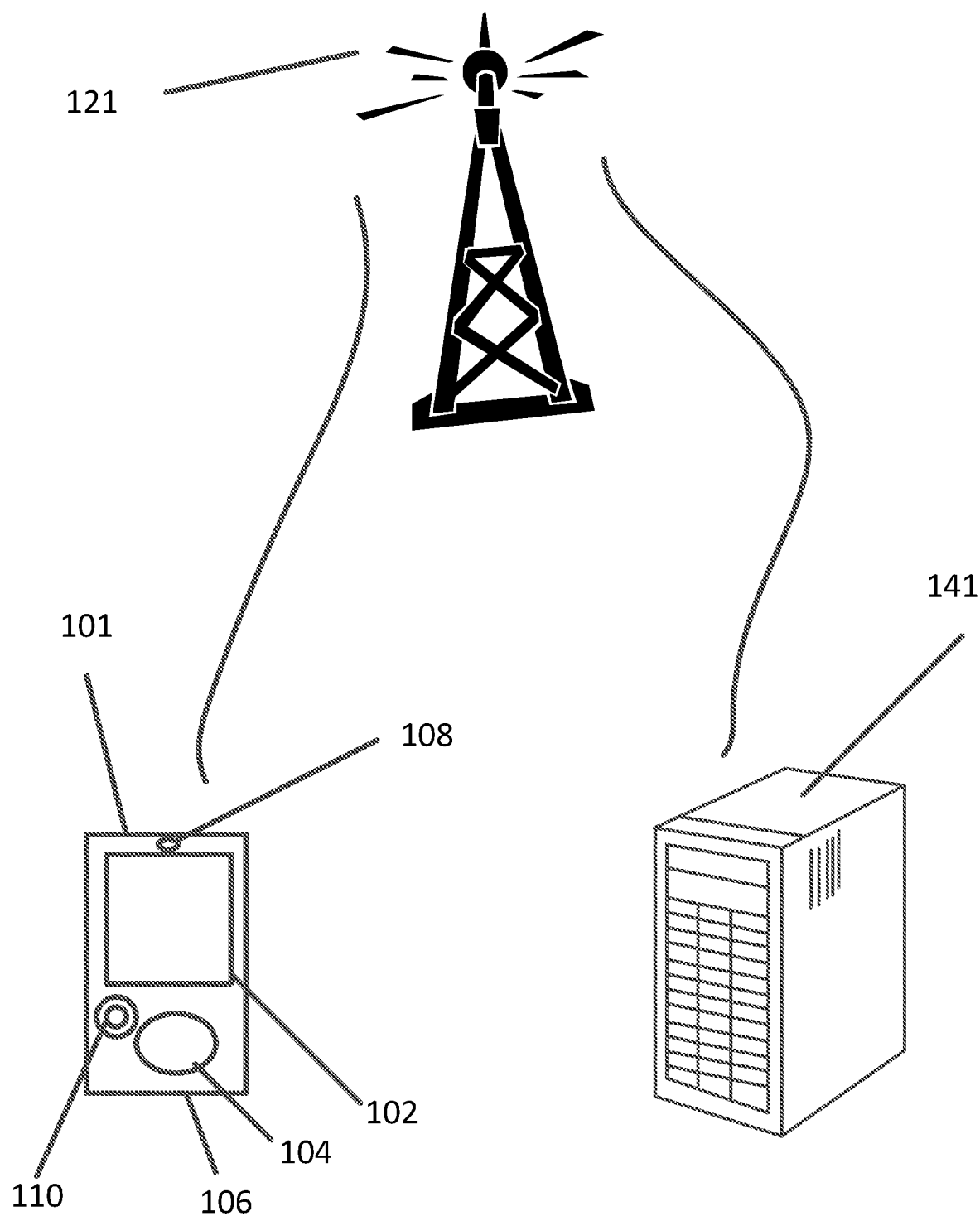
FIG. 5 is an illustration of another sample computing environment physically configured to execute the embodiments of the method according to one embodiment of the invention.

As illustrated in FIG. 5, payment transaction data may be received by the system in a variety of ways. In some embodiments, the portable computer devices 101 compliance with wireless personal area network, such as with near field communication (NFC) capability, may be used to communicate the payments transaction data to remote computing devices 141. In yet additional embodiments, the payment transaction data may be typed in by a user, such as a user of a personal computer. As may be understood, the relevant transaction data may be entered manually or may be communicated in an electronic fashion, such as through a communication device 121 and using Wi-Fi, Ethernet, NFC, infrared, high frequency communication systems or any other electronic communication format.

FIG. 5 may be a high level illustration of some of the elements in a sample computing system that may be physically configured to execute the various embodiments of the method. The computing system may be a dedicated computing device 141, a dedicated portable computer device 101, an application on the computing device 141, an application on the portable computer device 101 or a combination of all of these. FIG. 5 may be a high level illustration of a portable computer device 101 communicating with a remote computing device 141 through a communication device 121 but the application may be stored and accessed in a variety of ways. In addition, the application may be obtained in a variety of ways such as from an app store, from a web site, from a store WiFi system, etc. There may be various versions of the application to take advantage of the benefits of different computing devices, different computing languages and different API platforms.

Figure 6:
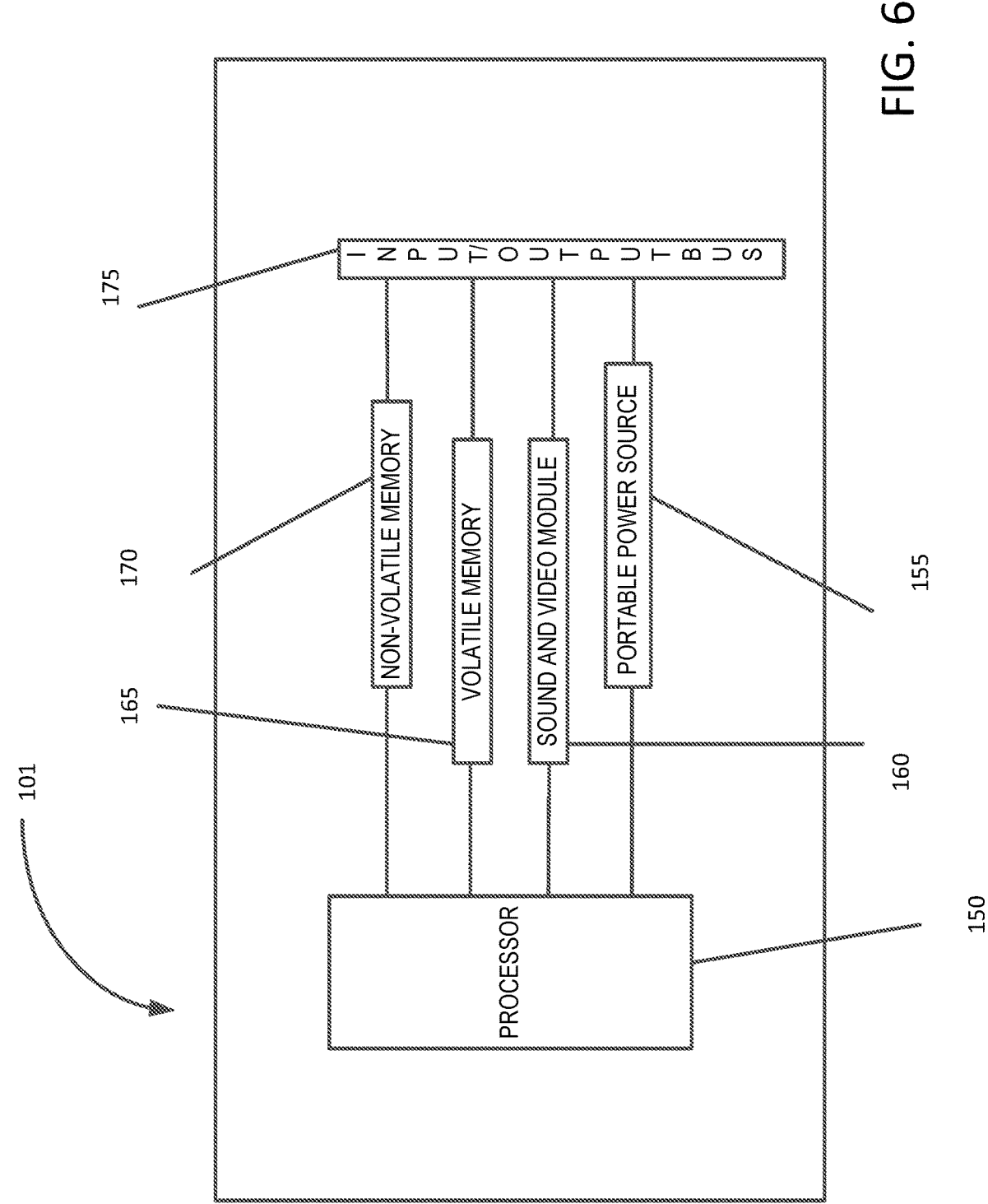
FIG. 6 is an illustration of a portable computer device which is physically configure according to the embodiments of the method.

In one embodiment, a portable computer device 101 may be a device that operates using a portable power source 155 such as a battery (FIG. 6). Referring to FIG. 5, the portable computer device 101 may also have a display 102 which may or may not be a touch sensitive display. More specifically, the display 102 may have a capacitance sensor, for example, that may be used to provide input data to the portable computer device 101. In other embodiments, an input pad 104 such as arrows, scroll wheels, keyboards, etc., may be used to provide inputs to the portable computer device 101. In addition, the portable computer device 101 may have a microphone 106 which may accept and store verbal data, a camera 108 to accept images and a speaker 110 to communicate sounds.

The portable computer device 101 may be able to communicate with a computing device 141 or a plurality of computing devices 141 that make up a cloud of computing devices 111 through a communication device 121. The portable computer device 101 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, Bluetooth low energy, cellular communication or near field communication devices. The communication may be direct to the computing device 141 or may be through a communication device or network of devices 121 such as cellular service, through the Internet, through a private network, through Bluetooth, through near field communications, etc. FIG. 6 may be a simplified illustration of the physical elements that make up a portable computer device 101 and FIG. 7 may be a simplified illustration of the physical elements that make up a server type computing device 141.

Referring to FIG. 6, a sample portable computer device 101 may be physically configured according to a method to be part of the system. Non-limiting examples of portable computer devices include portable computer systems including physically separate peripheral devices, mobile devices, client devices, smartphones, tablet computer, PDA, video game console, or any other device having a processor, memory, and communications capabilities. FIG. 6 may also be representative of a beacon device, as a portable computer device may also function as a beacon. The portable computer device 101 may have a processor 150 that is physically configured according to computer executable instructions. It may have a portable power supply 155 such as a battery which may be rechargeable. It may also have a sound and video module 160 which assists in displaying video and sound and may turn off when not in use to conserve power and battery life. The portable computer device 101 may also have volatile memory 165 and non-volatile memory 170. There also may be an input/output bus 175 that shuttles data to and from the various user input devices such as the microphone 106, the camera 108 and other inputs 102, etc. It also may control of communicating with the networks, either through wireless or wired devices. Of course, this is just one embodiment of the portable computer device 101 and the number and types of portable computer devices 101 is limited only by the imagination. The portable computer device 101 may act as the display 102 or may be a part of the display 102.

Figure 7:
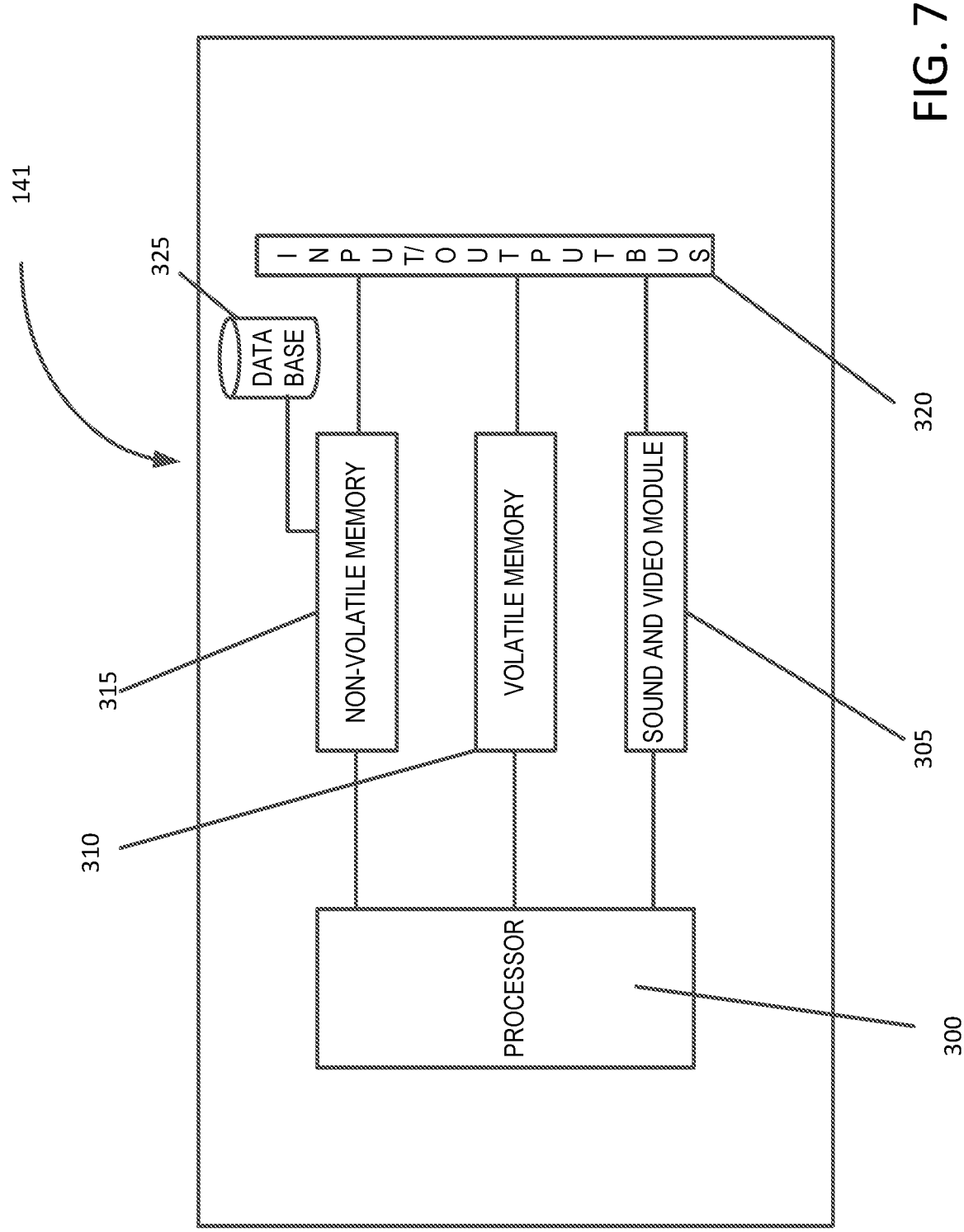
FIG. 7 is an illustration of a server type computing device which is physically configure according to the embodiments of the method.

The physical elements that make up the remote computing device 141, such as the payment or transaction approval system, may be implemented as a server, such as a beacon server, a transaction approval server or the like and is further illustrated in FIG. 7. At a high level, the computing device 141 may include a digital storage such as a magnetic disk, an optical disk, flash storage, non-volatile storage, etc. Structured data may be stored in the digital storage such as in a database. The server 141 may have a processor 30 that is physically configured according to computer executable instructions. It may also have a sound and video module 305 which assists in displaying video and sound and may turn off when not in use to conserve power and battery life. The server 141 may also have volatile memory 310 and non-volatile memory 315.

The database 325 may be stored in the memory 310 or 315 or may be separate. The database 325 may also be part of a cloud of computing device 141 and may be stored in a distributed manner across a plurality of computing devices 141. There also may be an input/output bus 320 that shuttles data to and from the various user input devices such as the microphone 106, the camera 108, the inputs 102, etc. The input/output bus 320 also may control of communicating with the networks, either through wireless or wired devices. In some embodiments, the application may be on the local computing device 101 and in other embodiments, the application may be remote 141. Of course, this is just one embodiment of the server 141 and the number and types of computing devices 141 is limited only by the imagination.

Figure 3:
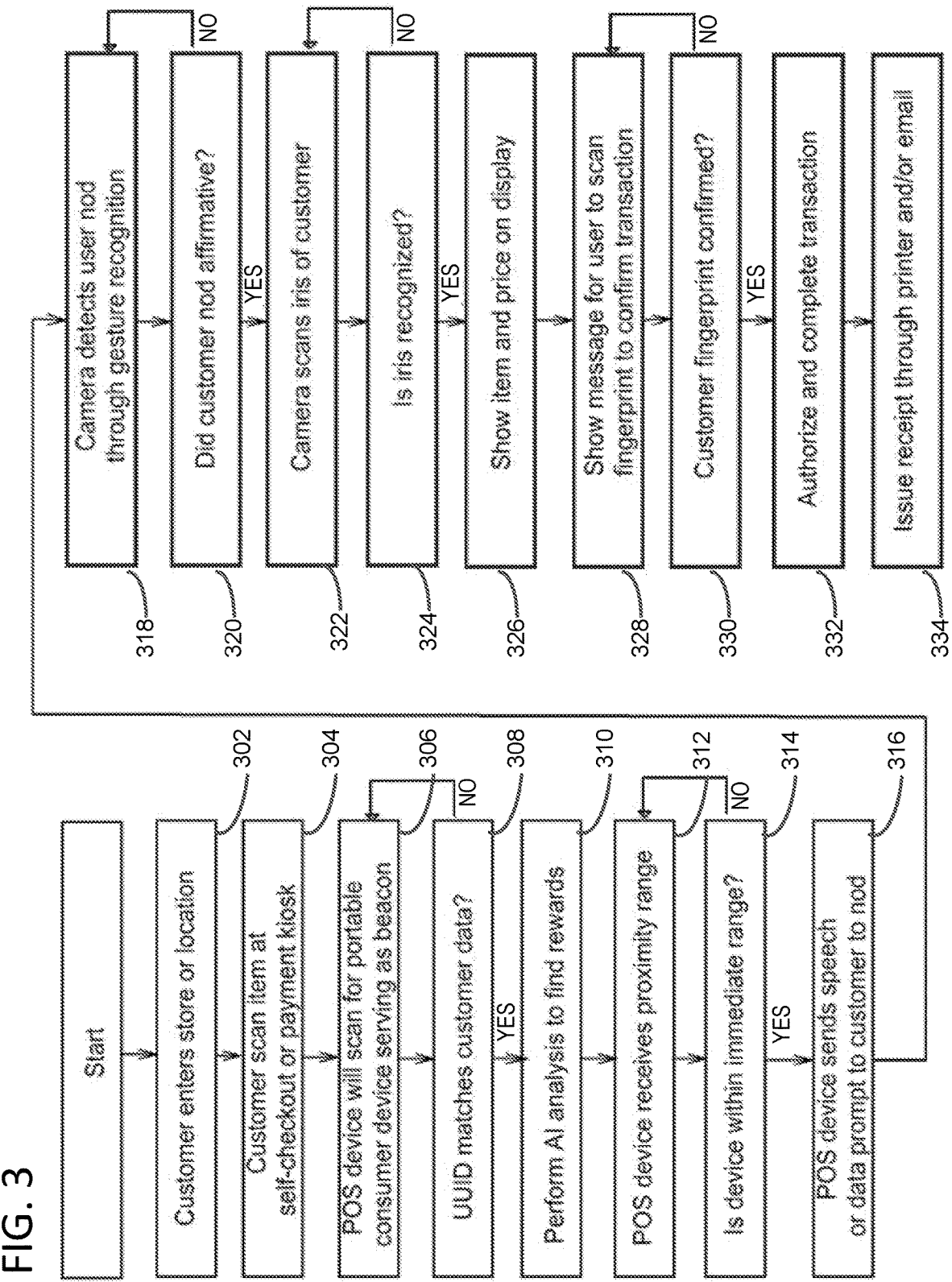
FIG. 3 is flow diagram of a method in accordance with the subject technology according to one embodiment of the invention.
Figure 9:
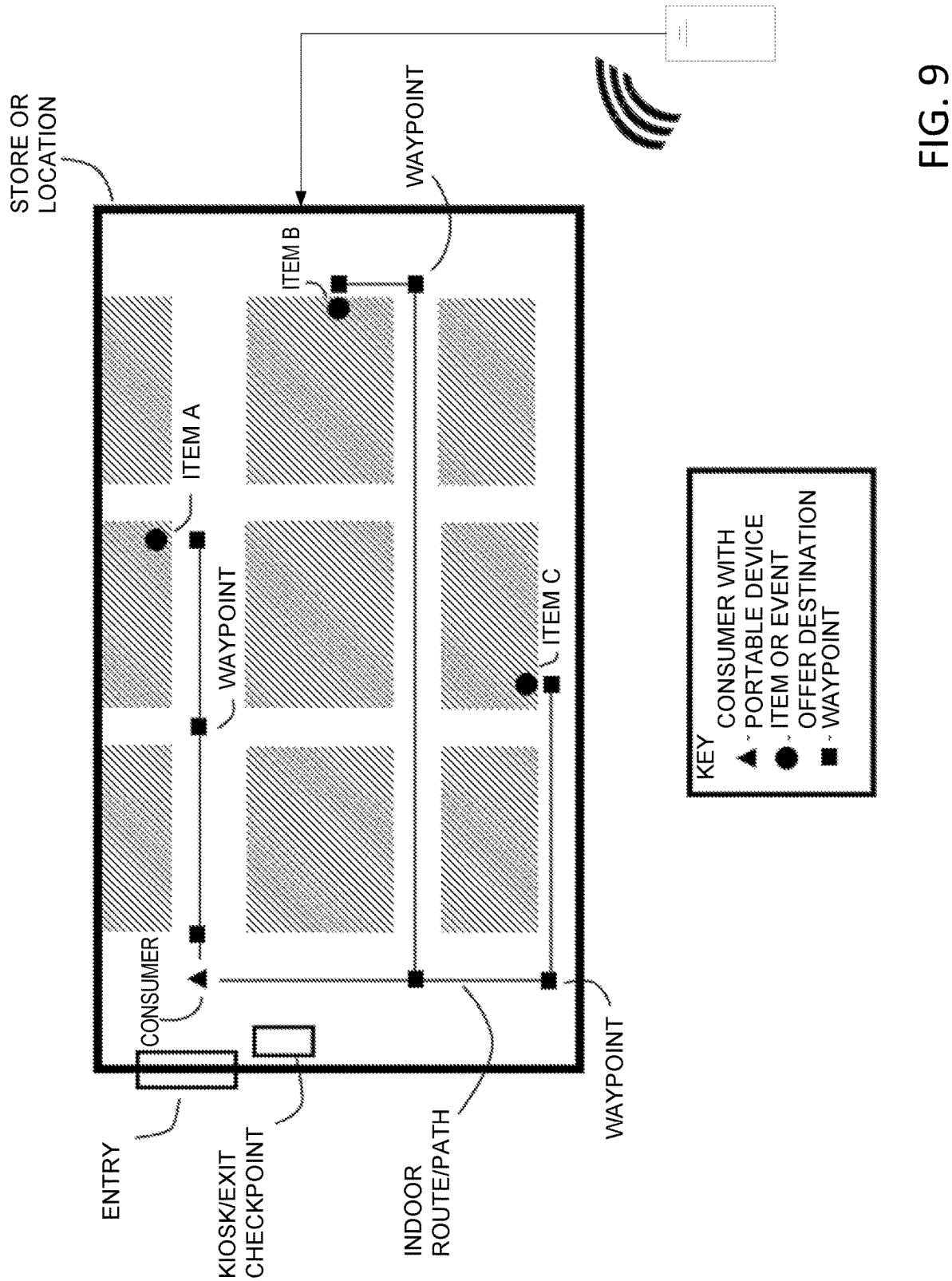
FIG. 9 is an illustration of an exemplary system for the navigation of consumers through sequential events toward digital payment offers according to one embodiment of the invention.

In further referring to FIGS. 2 and 9, FIG. 3 illustrates a flowchart illustrating another method from a perspective of a system, such as computing device or server 141, in accordance with the subject technology according to one embodiment of the invention. For example, the server 141 may be part of a system for configuring a multi-layered verification system for completing a transaction. The system includes one or more beacon emitting device (as shown in FIG. 2 and FIG. 4 as 180a, 180b, or 180c) for transmitting beacons on a time interval. The beacons include contents with varying messages as a function of signal strengths of the beacons.

As illustrated in FIG. 3, a customer enters a store, a location, an event, or a defined space at 302. In one embodiment, a customer may scan an item at shelf-checkout or payment kiosk at 304 in response to an item identified by the customer to conduct a digital transaction. In this embodiment, a point-of-sale (POS) device serving as a beacon may scan for a portable consumer device or a portable computer device at 306. With signal strengths of beacons from the beacon emitting devices indicating zones in the defined space covered by the beacons, such as UUID. In the system in this embodiment, the beacon emitting device or with the UUID transmitted to the server 141, the UUID may be compared with customer data at 308. If the comparison is negative, the system 141 or, alternatively, the beacon emitting device will return to 306 for other portable computer device. On the other hand, if the comparison is affirmative, the system 141 may proceed to identify relevant or related rewards or incentives in response to the determination (see description below for further details).

Still referring to FIG. 3, at 312, the POS device receives proximity range information in communication with the portable computer device and if the portable computer device is in range at 314, depending on the range information, the POS device may send contents or messages as a function of the signal strength at 316. In one example, the portable computer device includes an input/output circuit for sensing the beacons to identify the signal strengths thereof. As illustrated in FIG. 6, the portable computer device may include a device processor and an interface. A camera or other imaging device connected to the POS device may be activated to detect user's movement, such as nodding of heads or other body movements, as a gesture recognition at 318. The system next may perform a series of verification, such as at 320 whether the customer confirm nodding (implicitly meaning "YES" for a gesture recognition example) or, as illustrated above, iris scanner may be used at 322 and 324. Once the series of verifications are confirmed, at 326, the price and item is displayed or provided on a display connected with the POS or on the portable computer device. In another embodiment, one additional verification may be used, such as the user's fingerprint at 328 and 330. Once that verification is confirmed, the server may proceed to complete the digital transaction by treating the above verifications as authorizations to complete the transaction at 332. At 334, a receipt or acknowledge receipt may be provided to the user via a printed copy at the POS (via a printer connected to POS) or an electronic copy via email address.

In accordance with further embodiments, by using wireless personal area network technology (such as beacon technology like Bluetooth Low Energy), the subject technology provides navigation through a store in order for a customer to locate offers and conduct transactions to cardholding customers with a portable computing device (such as a smartphone). The navigation may consist of proximity notifications letting the consumer know that he is within a far, near, and immediate range that is ultimate associated with a universally unique identifier (UUID) (identifier distinguishing beacons used by the store chain, brand, or the app), major and minor pairs (specifying a group of beacons and specifying an individual beacon, respectively), and distance value (a signal strength) to a beacon in the store or location. Offers or incentives may be provided along with the navigation notifications.

One technical advantage provides customer assistance in locating products and special offers on the shelf within the store setting. Additional advantages include assisting customers in locating additional items of interest within the store based on items of interest, or providing navigation through the store based on shopping interest. Another technical advantage is to enable the consumer to announce his or her presence to the store and preferred social community using his or her smartphone device as a beacon once within a specific proximity using the same social and consumer networks that are associated with the consumer's cardholder's account. Still yet another technical advantage of the subject technology is to provide a system and method of indoor navigation that is seamlessly integrated with offer based transactions. Another benefit of the invention is providing location assistance to the customer without requiring the broadcast of customer location information. Yet another technical advantage of the subject technology is providing turn by turn navigation to customers to aid customers in locating products and offers based on the current location of the customer within the store. Further technical advantages are inventory management, loss prevention and optimization of traffic patterns throughout stores and events.

Aspects of the invention consist of a system whereby a cardholding customer with a portable consumer device can receive beacon notifications from a store establishment based upon a proximity-based Bluetooth Low Energy beacon in a store or location. The receiving device will detect the proximity ranges of far, near, and immediate associated with a universally unique identifier (UUID), major and minor pairs, distance values to determine incentives, offers and rewards for customers within the establishment. Exemplary ranges that may be associated with far, near, and immediate ranges may be thirty meters, two meters, and one half meters. Other ranges may be implemented without departing from the scope of the subject technology. While the customer's portable computing device may act only as a receiver, allowing no customer location information to be transmitted, alternative embodiments provide a system that also allow the customer to act as a beacon to announce their presence by sending out signal with a UUID to a beacon receiver located within the store to determine proximity using Bluetooth Low Energy. The system will allow customers to gain guidance to items of interest in the store and initiate digital transactions from the device for items within an immediate range and authorize the payment with a button that triggers a fingerprint scan to identify the authorized customer with the payment account.

Figure 8:
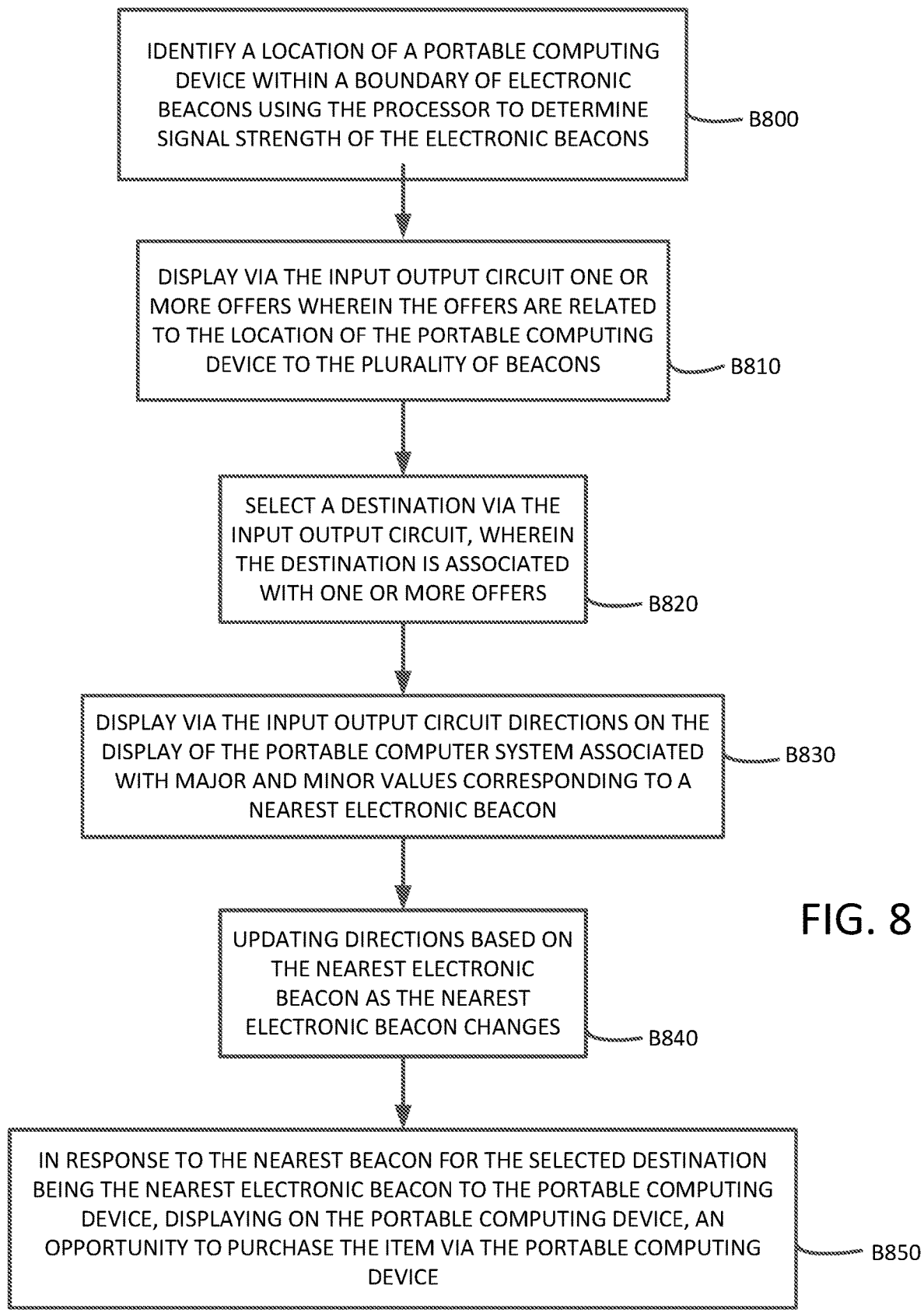
FIG. 8 is a flow diagram of a method in accordance with the subject technology according to one embodiment of the invention.

Referring to FIG. 8, at block B800, a location of a portable computing device is identified within a boundary of electronic beacons using a processor to determine signal strength of the electronic beacons. The portable computing device may be required to be a device that is authorized by the store or event as an authorized portable consumer device. The store or event may provide portable computing devices to consumers for use while in the store or at the event. For example, FIG. 9 illustrates a store example showing an entry of the store showing capabilities of embodiments of the invention. The customer may need to activate, download or turn on an application or "app" before coming within proximity of one of the beacons (i.e., waypoints). For example, FIG. 9 illustrates one or more waypoints along different locations or positions in the store.

At block B810, the input output circuit displays one or more offers wherein the offers are related to the location of the portable computing device to the plurality of beacons. As the input output circuit of the receiving device (i.e., portable computing device) detects beacons, proximity ranges of far, near, and immediate are determined based on UUID, major and minor pairs and distance values. Offers, incentives and rewards may be paired with the proximity ranges and displayed on the portable computing device of the customer. At block B820, a destination is selected via the input output circuit, wherein the destination is associated with one or more offers. At block B830, the input output circuit displays directions on the display of the portable computing system associated with major and minor pair values corresponding to a nearest electronic beacon. For example, according to FIG. 9, suppose a consumer (designed by a triangle symbol in FIG. 9) wishes to purchase item A. According to an embodiment of the invention, the input output circuit displays a direction to the item A based on the consumer's location or position.

At block B840, in one embodiment, the directions are updated based on the nearest electronic beacon as the nearest electronic beacon changes. Directions may include turn by turn navigation (e.g., indoor route/path shown in FIG. 9) based on landmarks in the store, approximate distances or may be provided by icons on the screen or sound indicators that let the customer know approximately when to turn, see also FIG. 9. At block B850, in response to the nearest beacon for the selected destination being the nearest electronic beacon to the portable computing device (i.e., the customer has reached immediate proximity of the beacon nearest the destination), an opportunity to purchase the item via the portable computing device is provided on the display.

Additional steps may include completing the transaction via the portable computing device by communication of digital payment information to a payment approval system via the input-output circuit, such as a kiosk or an exit checkout point, and in response to the digital payment being approved by the payment approval system, receiving confirmation of a successful transaction, and displaying a transaction receipt on the portable computing device.

In another embodiment, the portable computing device of the customer may communicate a low power signal, such as a beacon signal, and receivers in the store may evaluate the signal to determine if it is within one or more thresholds. Depending on the signal strength, the customer may be classified as being in a near, intermediate or far zone and relevant messages may be displayed as previously described. Similarly, the receivers may display messages and may be used to complete transactions at the point of sale. Of course, various other arrangements of beacons and portable computing devices are possible and are contemplated.

Figure 10A:
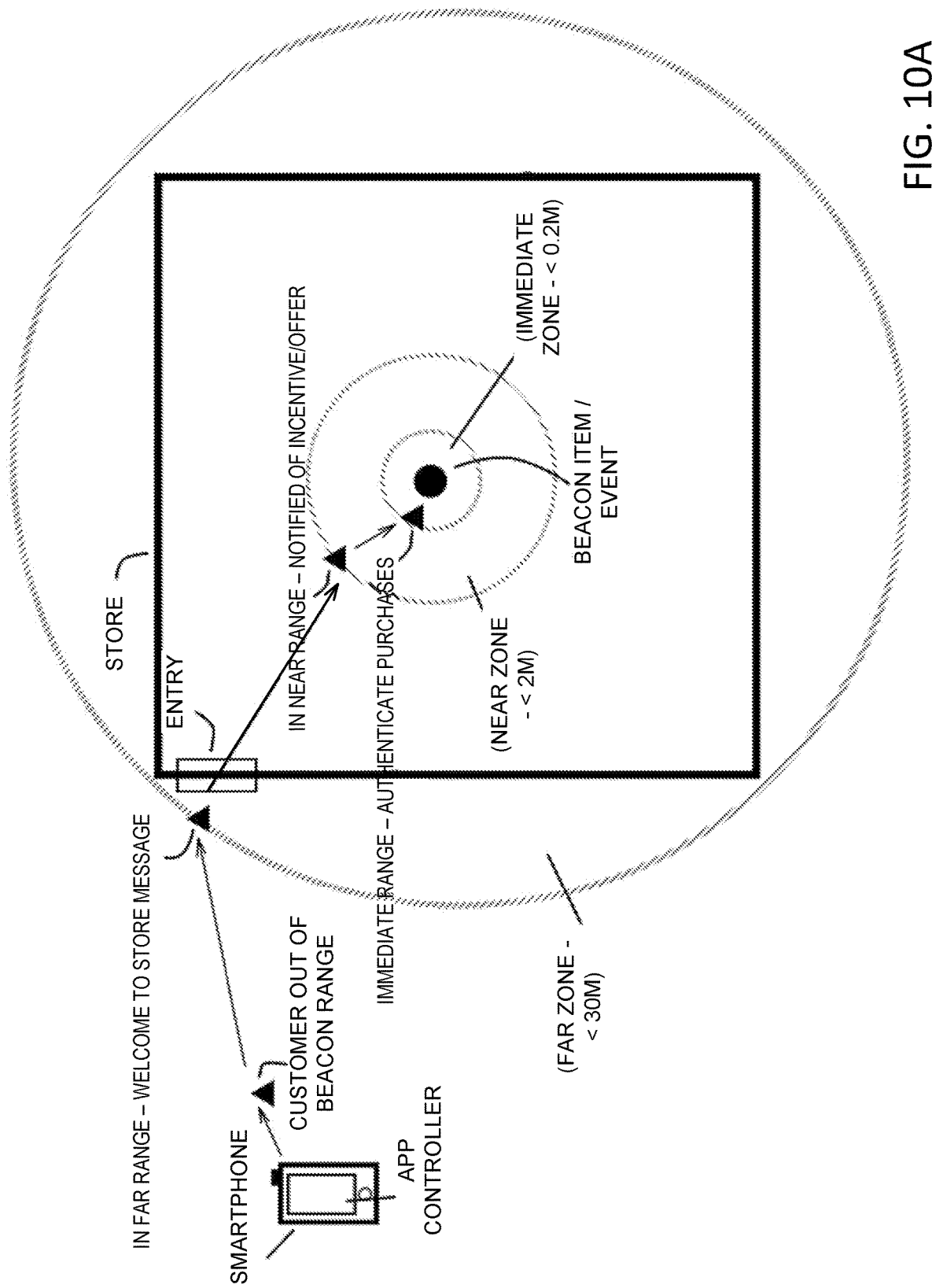
FIG. 10A is an illustration of an exemplary system using major and minor pairs to guide customers to digital payment transactions and event check-ins according to one embodiment of the invention.
Figure 10B:
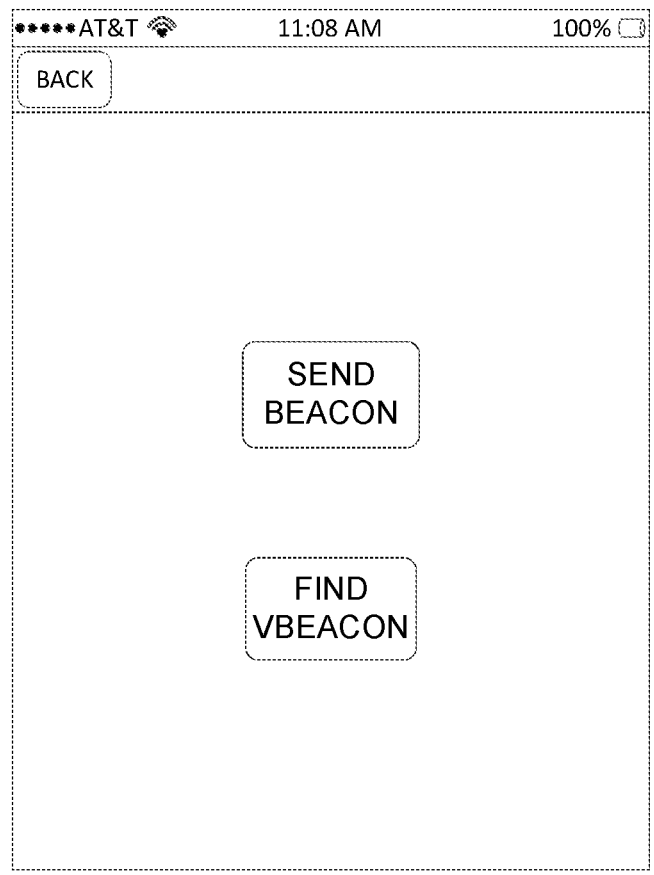
FIGS. 10B-10H are illustrations of a sample graphical user interface of the subject technology according to one embodiment of the invention.
Figure 10C:
Figure 10D:
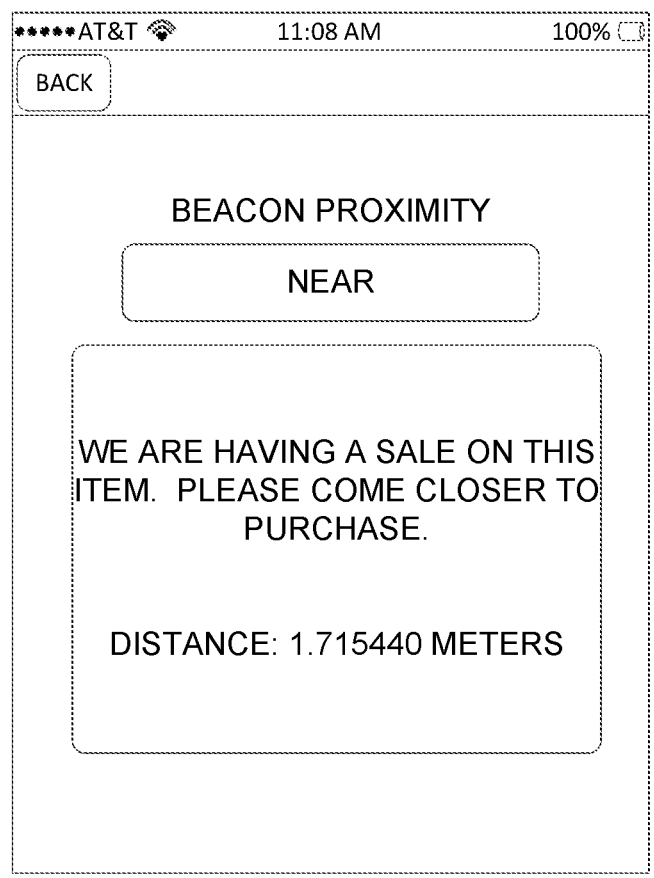
Figure 10E:
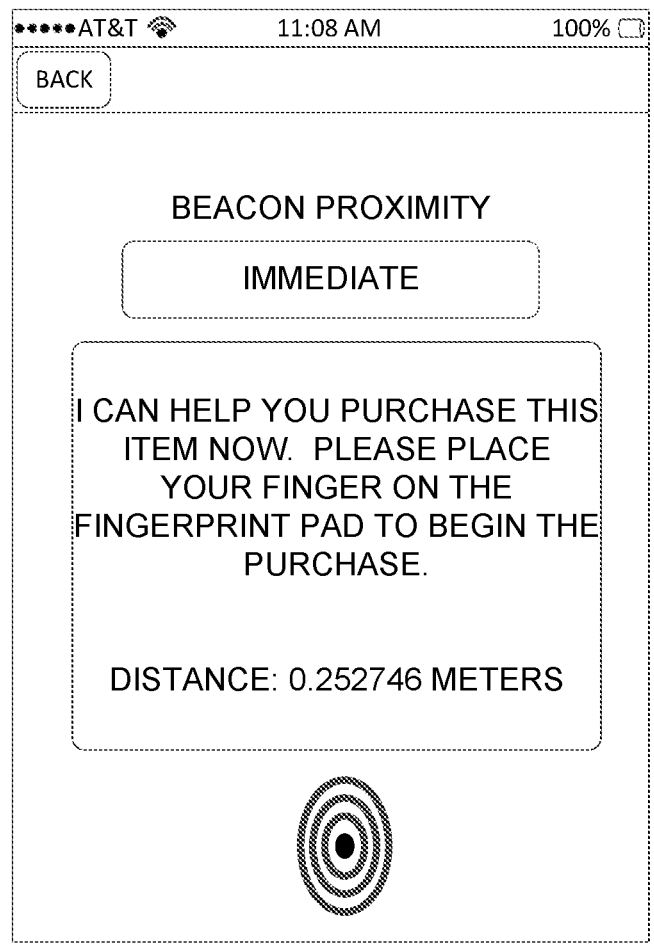
Figure 10F:
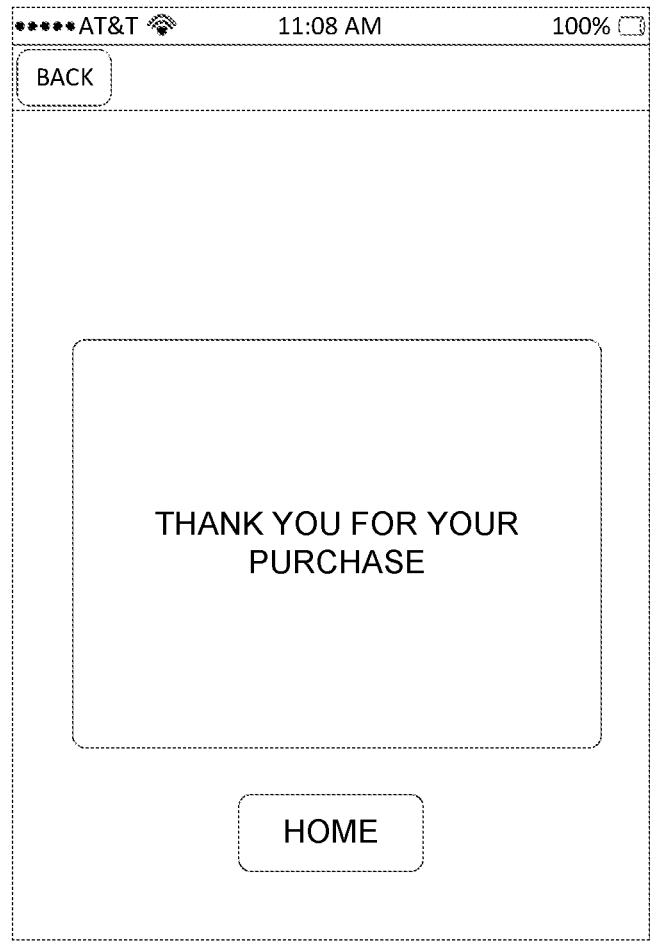

FIG. 10A (with reference to symbols illustrated in FIG. 9) is an illustration of an exemplary system using major and minor pairs to guide customers to digital payment transactions and event check-ins in accordance with an embodiment of the subject technology. Similar to FIG. 2, as shown in the exemplary embodiment of FIG. 10A, the customer may approach a store with the app running. Far proximity may be approximately thirty or less of meters of a beacon. Once approaching this threshold, the customer may receive a welcome message sent from the beacon transmitter. This geofence (i.e., virtual perimeter or threshold) may coincide with the threshold of the store or may include the area generally in front of a store or parking area. Once inside the store, the customer may enter the range of other beacons transmitting sales information and other associated offers related to a specific item. In this illustration, the beacon emitting device (e.g., 208) may be on the specific item or in a very close proximity to the specific item. The customer may then receive directional information from the beacons. Once within immediate proximity which may be a threshold of approximately two tenths of a meter of the beacon nearest the specific item, the customer may then be offered an opportunity to purchase the item. The customer may then complete the transaction using the customer's portable computing device. The transaction may include a combination of peripheral devices such as a touch screen, fingerprint scanner, camera, scanner, microphone, or combination of inputs. The customer will receive confirmation of the transaction at the point of sale by receipt, email, text, or other electronic means. The merchant may require additional verification of the transaction as the customer exits the store with the merchandise.

Figure 10G:
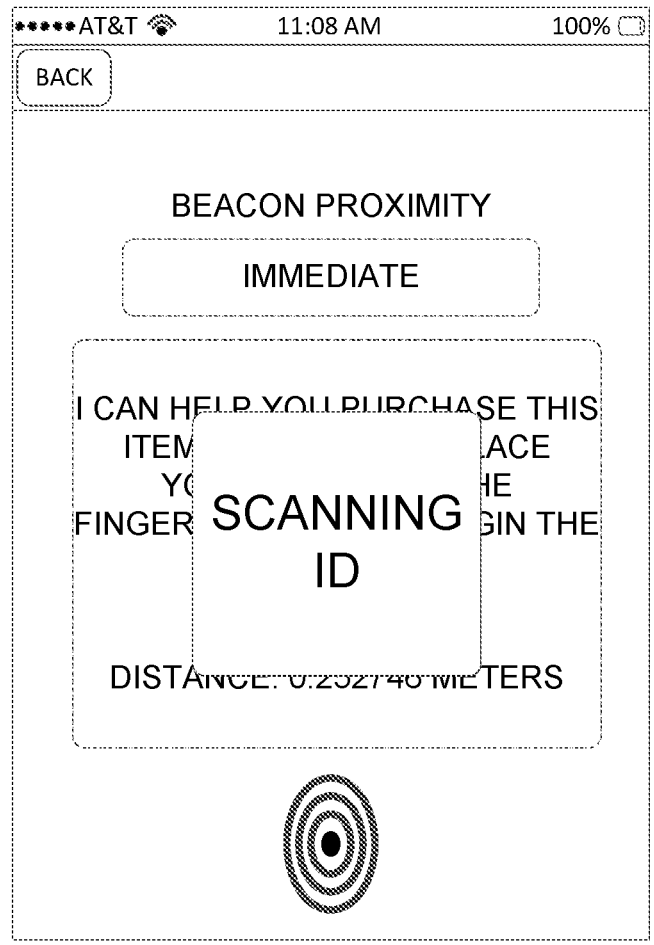
Figure 10H:
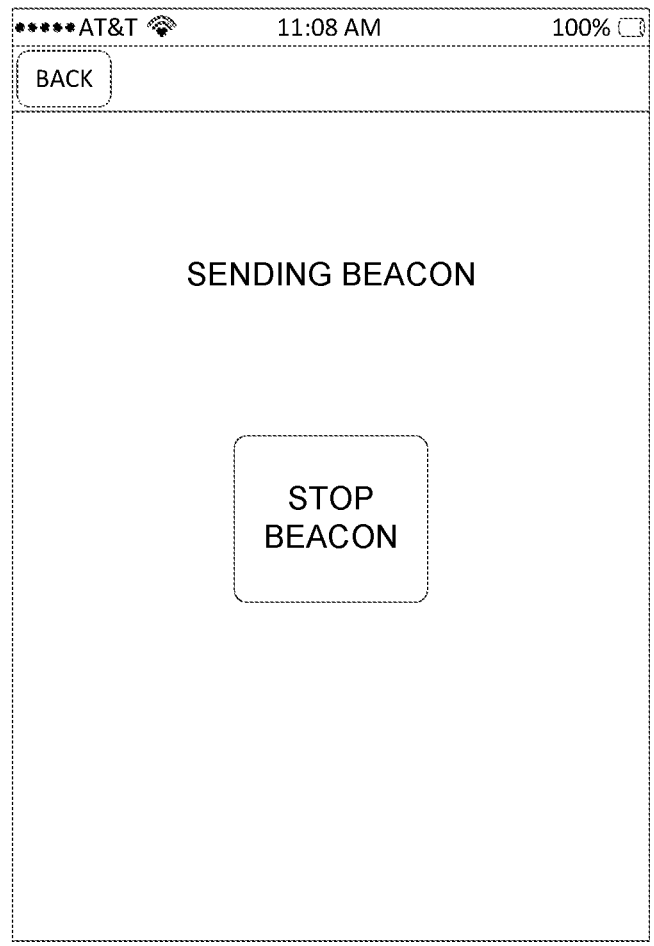

FIGS. 10B-10H are illustrations of a sample graphical user interface of the subject technology in accordance with an embodiment of the subject technology. As shown in FIG. 10G, digital payment transactions may include a fingerprint-authentication requirement in order to complete the payment transaction. Offers shown on the graphical user interfaces of FIGS. 10B-10H can be used to direct the user specifically and may include further directions such as "turn left next to the green sweaters" or "straight ahead past aisle four." Embodiments are contemplated in which the customer may be able to select audio based direction or simple intuitive graphical signals such as directional arrows and signs or even animation or video based directions with graphical overlays. By providing a point of sale system at the shelf, loss prevention can be reduced.

Figure 11:
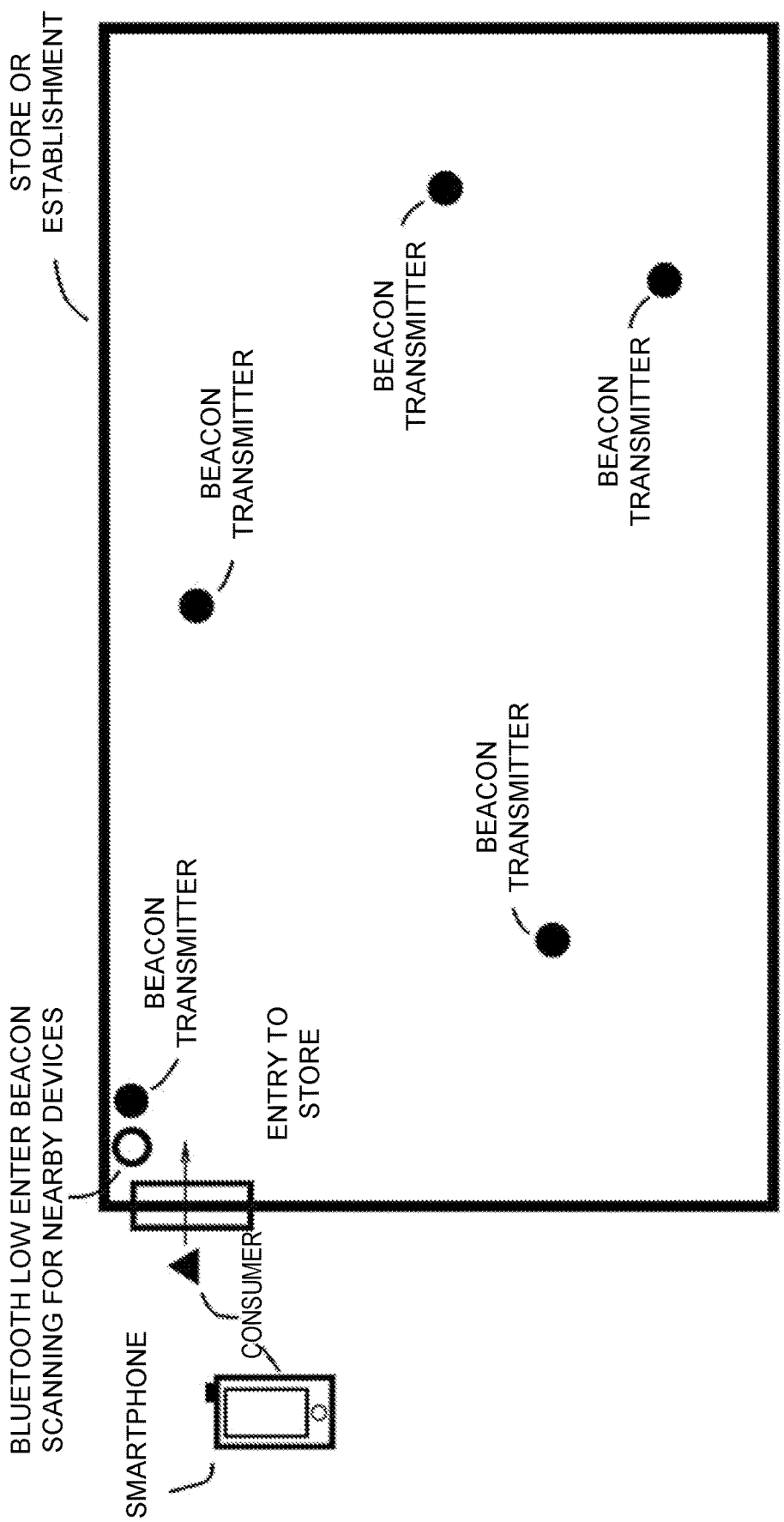
FIG. 11 is an illustration of an exemplary system capable of sending a check-in notification according to one embodiment of the invention.

FIG. 11 is an illustration of an exemplary system capable of sending a check-in notification in accordance with an embodiment of the subject technology. In some embodiments of the subject technology, the portable computing device may additionally act as a transmitter, that is, the portable computing device of the customer may also act as a beacon itself. It may transmit a signal with data including a UUID to a beacon receiver located within the store to determine the proximity of the portable computing device (and therefore, the customer). Once the customer has checked-in at the store or event location, the customer may then be able to receive additional information related to the store or event through the application software at future times or when the customer is not physically present in the store.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A system for configuring a multi-layered verification system for completing a transaction, said system comprising:
   a beacon emitting device for transmitting a wireless signal on a time interval, said wireless signal including contents with varying messages as a function of signal strength of the wireless signal, said signal strength indicating zones in a defined space covered by the wireless signal, wherein the zones include at least a first zone corresponding to a first threshold of the signal strength, a second zone corresponding to a second threshold of the signal strength, and a third zone corresponding to a third threshold of the signal strength, the second zone being between the first zone and the third zone, the third zone facilitating a portable computer device to complete the transaction;
   wherein the portable computer device comprising an input/output circuit for sensing the wireless signal to identify the signal strength thereof;
   wherein the portable computer device comprises a device processor and an interface;
   wherein the device processor is configured to determine the signal strength in the sensed wireless signal being over the second threshold;
   in response to the determination being positive, wherein the device processor of the portable computer device is configured to provide via the interface a first of the varying messages corresponding to the second threshold in the sensed wireless signal;
   in response to providing the first of the varying messages, wherein a data processor of the portable computer device, after sensing the wireless signal, is configured to determine the signal strength to be over the third threshold;
   in response to the determination of the signal strength over the third threshold being positive, wherein the device processor of the portable computer device is configured to provide via the interface a second of the varying messages corresponding to the third threshold;
   wherein the beacon emitting device receives a receipt from the portable computer device for receiving the second of the varying messages;
   a transaction approval server, being configured to communicate with the beacon emitting device, is configured to verify digital transactions in response to receiving the receipt, wherein the transaction approval server is configured to identify the receipt as a first layer in verification;
   wherein the portable computer device receives an instruction from a user via the interface to complete one of the digital transactions of an item, wherein the transaction approval server, in response to receiving the instruction relayed from the portable computer device, is configured to identify the instruction as a second layer in the verification;
   in response to the identified instruction, wherein the transaction approval server is configured to approve the second layer in the verification; and
   wherein the transaction approval server is configured to transmit an acknowledgement receipt to the portable computer device for the one of the digital transactions of the item.

2. The system of claim 1, further comprising in response to identifying the signal strength being over the first threshold, the portable computer device is configured to display one or more of the following information identifying the defined space, wherein the defined space comprises a physical store: a welcome message, an address of the defined space, and contact information.

3. The system of claim 1, wherein the portable computer device is configured to receive navigation information to sense wireless signals with the signal strength for the third threshold in response to the provided first of the varying messages.

4. The system of claim 1, wherein the input/output circuit or the beacon emitting device comprises a circuit in compliance with a wireless personal area network technology.

5. The system of claim 1, wherein the first of the varying messages comprises an offer to purchase the item.

6. The system of claim 1, wherein the second of the varying messages comprises an invitation to complete the one of the digital transactions of the item.

7. The system of claim 1, wherein the transaction approval server is configured to transmit the acknowledgement receipt to the beacon emitting device, and the beacon emitting device transmits the acknowledgement receipt to the portable computer device for the one of the digital transactions of the item.

8. The system of claim 1, wherein the portable computer device is further configured to connect with the transaction approval server in response to receiving the instructions from the user via the interface to complete the one of the digital transactions.

9. A system for completing digital transactions with a beacon-assisted navigation, said system comprising:
- a beacon emitting device for transmitting a wireless signal on a time interval, said wireless signal including contents with varying messages as a function of signal strength of the wireless signal, said signal strength indicating zones in a defined space covered by the wireless signal;
- a portable computer device comprising an input/output circuit for sensing the wireless signal to identify the signal strength thereof;
- wherein the portable computer device comprises a device processor and an interface;
- wherein the device processor is configured to identify items of interests for a user;
- wherein the device processor is configured to determine the signal strength in the sensed wireless signal being over a second threshold and a first threshold;
- in response to the determination being positive, the device processor is configured to identify the varying messages corresponding to the second threshold in the sensed wireless signal;
- wherein the device processor is configured to analyze the identified items of interests and the identified varying messages;
- wherein the device processor is configured to provide a first of the varying messages via the interface, said first of the varying messages comprising an offer to purchase an item;
- in response to providing the first of the varying messages, wherein the portable computer device, after sensing the wireless signal, is configured to determine the signal to be over a third threshold;
- wherein the device processor is configured to provide via the interface a second of the varying messages corresponding to the third threshold;
- a transaction approval server, being configured to communicate with the beacon emitting device, receives a receipt from the beacon emitting device;
- in response to providing the second of the varying messages, wherein the portable computer device receives an instruction from a user via the interface to complete one of the digital transactions of the item;
- wherein the transaction approval server is configured to approve the one of the digital transactions after receiving the instruction from the user; and
- wherein the transaction approval server, being configured to communicate with the portable computer device, is configured to transmit an acknowledgement receipt to the portable computer device for the one of the digital transactions of the item.

10. The system of claim 9, further comprising in response to identifying the signal strength being over the first threshold, the portable computer device is configured to display one or more of the following information identifying the defined space, wherein the defined space comprises a physical store: a welcome message, an address of the defined space, and contact information.

11. The system of claim 9, wherein the portable computer device is configured to receive navigation information to sense wireless signals with the signal strength for the third threshold in response to the provided first of the varying messages.

12. The system of claim 9, wherein the input/output circuit or the beacon emitting device comprises a circuit in compliance with a wireless personal area network technology.

13. The system of claim 9, further comprising a data processor of the central unit being configured to transmit the acknowledgement receipt to the beacon emitting device, and the beacon emitting device transmits the acknowledgement receipt to the portable computer device for the one of the digital transactions of the item.

14. The system of claim 9, wherein the portable computer device is further configured to connect with a transaction approval system in response to receiving the instructions from the user.

15. A system for configuring a multi-layered verification system for completing a transaction, said system comprising:
- a beacon emitting device for transmitting a wireless signal on a time interval, said wireless signal including contents with varying messages as a function of signal strength of the wireless signal, the signal strength indicating zones in a defined space covered by the wireless signal;
- a portable computer device is configured for sensing the wireless signal to identify the signal strength thereof, said portable computer device comprising a mobile device;
- wherein the portable computer device is configured to identify items of interests for a user;
- wherein the portable computer device is configured to determine the signal strength in the sensed wireless signal being over a second threshold and a first threshold;
- in response to the determination being positive, the portable computer device is configured to identify the varying messages corresponding to the second threshold in the sensed wireless signal;
- wherein the portable computer device is configured to receive a relevant rewards or incentives after an item is compared with the identified varying messages;

in response to providing the first of the varying messages, wherein the portable computer device, after sensing the wireless signal, is configured to determine the signal strength to be over a third threshold;

in response to the determination of the signal strength over the third threshold being positive, wherein the portable computer device is configured to provide a second of the varying messages corresponding to the third threshold, wherein the second of the varying messages comprises an invitation to complete one of the digital transactions of the item;

wherein the beacon emitting device receives a receipt from the portable computer device for receiving the second of the varying messages;

a transaction approval server, being configured to communicate with the beacon emitting device, is configured to verify digital transactions in response to receiving the receipt, wherein the transaction approval server is configured to identify the receipt as a first layer in the verification;

wherein the portable computer device is configured to receive an instruction from a user to complete one of the digital transactions of the item, wherein the transaction approval server, in response to receiving the instruction relayed from the portable computer device, is configured to identify the instruction as a second layer in the verification;

in response to the identified instruction, wherein the transaction approval server is configured to approve the second layer in the verification; and wherein the transaction approval server is configured to transmit an acknowledgement receipt to the portable computer device for the digital transaction of the item.

16. The system of claim 15, further in response to identifying the signal strength being over the first threshold, the portable computer device is configured to display one or more of the following information identifying the defined space,
wherein the defined space comprises a physical store: a welcome message, an address of the defined space, and contact information.

17. The system of claim 15, wherein the portable computer device is configured to receive navigation instructions to sense wireless signals with the signal strength for the third threshold in response to the provided first of the varying messages.

18. The system of claim 17, wherein the input/output circuit or the beacon emitting device comprises a circuit in compliance with a wireless personal area network technology.

19. The system of claim 15, wherein the portable computer device is configured to identify the items of interests from one or more of the following sources: a social network account of the user, a memory of the portable computer device, and an account of the user stored externally from the portable computer device.

20. The system of claim 15, wherein the portable computer device is further configured to connect with the transaction approval server in response to receiving the instruction from the user to complete the one of the digital transactions.

* * * * *